United States Patent
Kim et al.

(10) Patent No.: US 8,971,285 B2
(45) Date of Patent: Mar. 3, 2015

(54) METHOD FOR TRANSMITTING REFERENCE SIGNALS FOR RELAY NODE

(75) Inventors: Eun Sun Kim, Anyang-si (KR); Byeong Geol Cheon, Anyang-si (KR); Ki Jun Kim, Anyang-si (KR); Hak Seong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 287 days.

(21) Appl. No.: 12/989,273

(22) PCT Filed: Sep. 23, 2009

(86) PCT No.: PCT/KR2009/005416
§ 371 (c)(1),
(2), (4) Date: Oct. 22, 2010

(87) PCT Pub. No.: WO2010/041835
PCT Pub. Date: Apr. 15, 2010

(65) Prior Publication Data
US 2011/0038321 A1 Feb. 17, 2011

Related U.S. Application Data

(60) Provisional application No. 61/104,268, filed on Oct. 10, 2008.

(30) Foreign Application Priority Data

Dec. 19, 2008 (KR) .................. 10-2008-0130180

(51) Int. Cl.
*H04W 74/04* (2009.01)
*H04B 7/26* (2006.01)
(Continued)

(52) U.S. Cl.
CPC ............ *H04B 7/2606* (2013.01); *H04L 5/0007* (2013.01); *H04L 5/0035* (2013.01); *H04L 5/0048* (2013.01); *H04L 27/261* (2013.01)
USPC ........... 370/330; 370/336; 370/343; 370/345; 370/478; 370/780

(58) Field of Classification Search
None
See application file for complete search history.

(56) References Cited

U.S. PATENT DOCUMENTS 8,315,225 B2 * 11/2012 Xu et al. ................... 370/330
2007/0229355 A1 10/2007 Han et al.
(Continued)

FOREIGN PATENT DOCUMENTS

KR 10-2000-0031128 A 6/2000
KR 10-2005-0092943 A 9/2005
(Continued)

OTHER PUBLICATIONS

3GPP TS 36.211 V8.4.0 (Sep. 2008), 3rd Generation Partnership Project; Technical Specification Group Radio Access Network; Evolved Universal Terrestrial Radio Access (E-UTRA); Physical Channels and Modulation (Release 8), pp. 1-78.
(Continued)

*Primary Examiner* — Hanh N Nguyen
*Assistant Examiner* — Joshua A Kading
(74) *Attorney, Agent, or Firm* — Birch, Stewart, Kolasch & Birch, LLP

(57) ABSTRACT

A method for transmitting reference signals for a relay node is disclosed. The method includes transmitting a first reference signals for a base station in a first transmission region of a subframe and a second reference signals for a relay node in a second transmission region of the subframe. The first transmission region and the second transmission region in the subframe are regions for transmitting data and the first transmission region and the second transmission regions are different sub-bands of Physical Downlink Shared Channel (PDSCH). Accordingly, it is possible to transmit wideband reference signals by the relay node, to maximally support a Long Term Evolution (LTE) user equipment while operating the relay node, and to perform cooperative multipoint transmission and reception between the base station and the relay node.

6 Claims, 14 Drawing Sheets

(51) Int. Cl.
*H04L 5/00* (2006.01)
*H04L 27/26* (2006.01)
*H04W 74/00* (2009.01)

(56) References Cited

U.S. PATENT DOCUMENTS

| | | |
|---|---|---|
| 2008/0039011 A1 | 2/2008 | Chang et al. |
| 2008/0212514 A1 | 9/2008 | Chen |
| 2010/0008282 A1* | 1/2010 | Bhattad et al. ........... 370/312 |
| 2010/0008317 A1* | 1/2010 | Bhattad et al. ........... 370/329 |
| 2010/0080166 A1* | 4/2010 | Palanki et al. ........... 370/315 |
| 2012/0093061 A1* | 4/2012 | Charbit et al. ........... 370/315 |

FOREIGN PATENT DOCUMENTS

| | | |
|---|---|---|
| KR | 10-2008-0022389 A | 3/2008 |
| WO | WO 2007/069848 A2 | 6/2007 |

OTHER PUBLICATIONS

3GPP TSG RAN WG1 #54bis, "Decode and Forward Relays for E-UTRA enhancements," Oct. 2008, R1-083533, pp. 1-5.

\* cited by examiner

METHOD FOR TRANSMITTING REFERENCE SIGNALS FOR RELAY NODE

CROSS REFERENCE TO RELATED APPLICATIONS

This application is the National Phase of PCT/KR2009/005416 filed on Sep. 23, 2009 which claims priority under 35 U.S.C 119(e) of U.S. Provisional Application No. 61/104,268 filed on Oct. 10, 2008 and under 35 U.S.C 119(a) to Patent Application No. 10-2008-0130180 filed in Korea on Dec. 19, 2008. The entire contents of all of the above applications are hereby incorporated by reference into the present application.

TECHNICAL FIELD

The present invention relates to a signal transmission method capable of efficiently reporting resources used in a relay node (RN) in a communication system including the relay node, and more particularly, to a method for transmitting reference signals (RSs) for an RN.

BACKGROUND ART

When packets are transmitted in a mobile communication system, the packets are transmitted via a wireless channel and thus distortion of a signal may occur in the transmission process. In order to enable a receiver to accurately receive the signal, channel information should be acquired such that the distortion of the transmitted signal is corrected by the channel information. In order to acquire the channel information, a method for transmitting a signal known to both a transmitter and a receiver and acquiring channel information from the distortion degree of the signal when the signal is received via a channel is mainly used. At this time, the signal known to both the transmitter and the receiver is referred to as a pilot signal or a reference signal (RS).

Recently, in most mobile communication systems, when packets are transmitted, a method for improving data transmission/reception efficiency using multiple transmission antennas and multiple reception antennas has been used, unlike the related art using one transmission antenna and one reception antenna. The transmitter or the receiver of the mobile communication system uses multiple antennas so as to increase capacity or improve performance. If data is transmitted or received using multiple antennas, in order to accurately receive the signal, the channel statuses between the transmission antennas and the reception antennas should be acquired from the respective RSs of the transmission antennas.

In a mobile communication system, RSs may be largely divided into two RSs according to their purposes: a common-RS for acquiring channel information and an RS used for data demodulation. The former is used for enabling a User Equipment (UE) to acquire downlink channel information. Therefore, the common-RS should be transmitted in a wideband, and even a UE which does not downlink data in a specific subframe can receive and measure this RS. In addition, the common-RS is also used for measurement for handover or the like. The latter is an RS which is sent together with resources when a base station (eNB) sends downlink data. The UE may receive this RS so as to perform channel estimation and demodulate the data. This RS should be transmitted in a region in which data is transmitted.

FIG. 1 is a view showing a downlink frame structure of Long Term Evolution (LTE).

The basic frame structure is the LTE structure shown in FIG. 1. A Physical Downlink Control Channel (PDCCH) region in which a control signal is transmitted and a Physical Downlink Shared Channel (PDSCH) region in which data is transmitted are Time-Division-Multiplexed (TDM) in every subframe. When the eNB transmits a signal in downlink, the PDCCH is transmitted first and the PDSCH is then transmitted. The PDCCH includes information about the PDSCH. UEs acquire information indicating in which region or with what Modulation Coding Scheme (MCS) level their data is transmitted, by decoding the PDCCH. When the eNB transmits the PDCCH, information about the data of several UEs is transmitted. At this time, the eNB forms the PDCCH using the ID of each of the UEs. Each of the UEs decodes the PDCCH using its UE ID.

In a cellular communication system in which one eNB controls a plurality of UEs, the plurality of UEs receives control information via a downlink control channel transmitted from the eNB. At this time, since the number of PDCCHs which can be transmitted by the eNB at once is limited, different PDCCHs are not allocated to the UEs in advance, but the eNB transmits the control signal to any UE via any PDCCH. Each of the UEs checks whether the control information transmitted via the PDCCH corresponds to the UE, using the UE ID included in the PDCCH. At this time, each of the UEs decodes a plurality of PDCCHs (or a plurality of possible PDCCH formats), receives the control information of the PDCCH if there is a PDCCH corresponding to the UE, and performs an operation.

When packets are transmitted in a mobile communication system, the packets are transmitted via a wireless channel and thus distortion of a signal may occur in the transmission process. In order to enable a receiver to accurately receive the signal, channel information should be acquired such that the distortion of the transmitted signal is corrected by the channel information. In order to acquire the channel information, a method for transmitting a signal known to both a transmitter and a receiver and acquiring channel information from the distortion degree of the signal when the signal is received via a channel is mainly used. At this time, the signal known to both the transmitter and the receiver is referred to as a pilot signal or a reference signal (RS).

Recently, in most mobile communication systems, when packets are transmitted, a method for improving data transmission/reception efficiency using multiple transmission antennas and multiple reception antennas has been used, unlike the related art using one transmission antenna and one reception antenna. The transmitter or the receiver of the mobile communication system uses multiple antennas so as to increase capacity or improve performance. If data is transmitted or received using multiple antennas, in order to accurately receive the signal, the channel statuses between the transmission antennas and the reception antennas should be acquired from the respective RSs of the transmission antennas.

In a mobile communication system, RSs may be largely divided into two RSs according to their purposes: a common-RS for acquiring channel information and an RS used for data demodulation. The former is used for enabling a User Equipment (UE) to acquire downlink channel information. Therefore, the common-RS should be transmitted in a wideband, and even a UE which does not downlink data in a specific subframe can receive and measure this RS. In addition, the common-RS is also used for measurement for handover or the like. The latter is an RS which is sent together with resources when a base station (eNB) sends downlink data. The UE may receive this RS so as to perform channel estimation and demodulate the data. This RS should be transmitted in a region in which data is transmitted.

FIG. 1 is a view showing a downlink frame structure of Long Term Evolution (LTE).

The basic frame structure is the LTE structure shown in FIG. 1. A Physical Downlink Control Channel (PDCCH) region in which a control signal is transmitted and a Physical Downlink Shared Channel (PDSCH) region in which data is transmitted are Time-Division-Multiplexed (TDM) in every subframe. When the eNB transmits a signal in downlink, the PDCCH is transmitted first and the PDSCH is then transmitted. The PDCCH includes information about the PDSCH. UEs acquire information indicating in which region or with what Modulation Coding Scheme (MCS) level their data is transmitted, by decoding the PDCCH. When the eNB transmits the PDCCH, information about the data of several UEs is transmitted. At this time, the eNB forms the PDCCH using the ID of each of the UEs. Each of the UEs decodes the PDCCH using its UE ID.

In a cellular communication system in which one eNB controls a plurality of UEs, the plurality of UEs receives control information via a downlink control channel transmitted from the eNB. At this time, since the number of PDCCHs which can be transmitted by the eNB at once is limited, different PDCCHs are not allocated to the UEs in advance, but the eNB transmits the control signal to any UE via any PDCCH. Each of the UEs checks whether the control information transmitted via the PDCCH corresponds to the UE, using the UE ID included in the PDCCH. At this time, each of the UEs decodes a plurality of PDCCHs (or a plurality of possible PDCCH formats), receives the control information of the PDCCH if there is a PDCCH corresponding to the UE, and performs an operation.

DISCLOSURE

Technical Problem

Accordingly, the present invention is directed to a method for transmitting reference signals (RSs) for a relay node (RN) that substantially obviates one or more problems due to limitations and disadvantages of the related art.

An object of the present invention is to provide a method for transmitting RSs for an RN, which is capable of using the RN while maintaining compatibility with the existing Long Term Evolution (LTE) system and transmitting wideband RSs for the RN.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for transmitting reference signals for a relay node using reference signals designed for a base station includes transmitting a signal indicating that second reference signals for the relay node are transmitted using reference signal resources for at least one antenna port of first reference signals transmitted by the base station to a user equipment, and transmitting the second reference signals in a subframe in which the relay node transmits signals simultaneously with the base station.

The second reference signals may include reference signals for data transmitted by the relay node.

If the second reference signals include the reference signals for the data transmitted by the relay node, the reference signals for the data may be transmitted in the format of dedicated reference signals.

If the second reference signals include the reference signals for the data, the reference signals for the data may be dedicated reference signals corresponding in number to the number of the antenna ports of the relay node, and may be signaled to the user equipment using a plurality of virtual antenna ports.

Information about a subframe period, in which the second reference signals are transmitted, may be transmitted to the user equipment, before transmitting the second reference signals.

The relay node may be any one of a Frequency Division (FD) relay node or a Time Division (TD) relay node.

In another aspect of the present invention, a method for transmitting reference signals for a relay node using reference signals defined for a base station includes transmitting a signal indicating that second reference signals for the relay node are transmitted in a state of being delayed by a predetermined time from a point of time when first reference signals for the base station are transmitted, and transmitting the second reference signals by the relay node after the delay of the predetermined time.

The second reference signals may be generated using the pattern of the first reference signals.

In another aspect of the present invention, a method for transmitting reference signals for a relay node includes transmitting a signal indicating that second reference signals for the relay node are transmitted using a specific symbol of a subframe, in which first reference signals for a base station are transmitted, to a user equipment, and transmitting the second reference signals corresponding in number to the number of antennas of the relay node by the relay node using the specific symbol.

The base station and the relay node may transmit the reference signals in an entire band.

The transmitting of the second reference signals may include transmitting the second reference signals with a predetermined subframe period. In this case, information about the subframe period may be transmitted to the user equipment before transmitting the second reference signals.

The specific symbol may be a last symbol of the subframe transmitted by the relay node.

Reference signals for data may be transmitted in the format of dedicated reference signals in the subframe in which the relay node transmits data.

The reference signals for the data may be dedicated reference signals corresponding in number to the number of the antenna ports of the relay node, and may be signaled to the user equipment using a plurality of virtual antenna ports.

It is to be understood that both the foregoing general description and the following detailed description of the present invention are exemplary and explanatory and are intended to provide further explanation of the invention as claimed.

Advantageous Effects

According to the embodiment of the present invention, it is possible to transmit wideband reference signals by the relay node, to maximally support a Long Term Evolution (LTE) user equipment while operating the relay node, and to perform cooperative multipoint transmission and reception between the base station and the relay node.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR INVENTION

Figure 1:
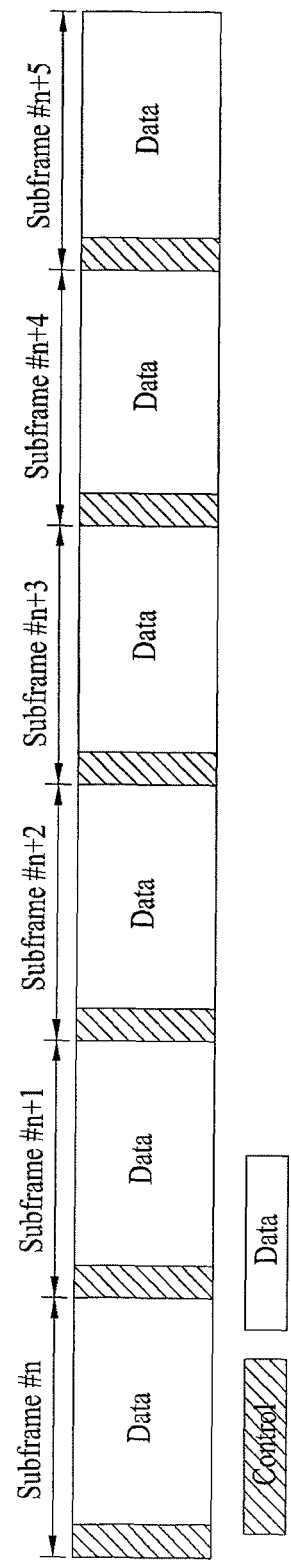
FIG. 1 is a view showing a downlink frame structure of Long Term Evolution (LTE)

Hereinafter, the preferred embodiments of the present invention will be described with reference to the accompanying drawings. However, the following embodiments of the present invention may be variously modified and the range of the present invention is not limited to the following embodiments.

In a mobile communication system, when a base station (eNB) and a relay node (RN) coexist, the RN depends on the eNB. The RN may be largely divided into three RNs including an L1 (Layer 1) RN, an L2 (Layer 2) RN and an L3 (Layer 3) RN according to the functions thereof. The L1, L2 and L3 RNs are divided based on the functions of the RNs and communication layers thereof. The detailed accurate functions and layers are not defined yet, but the features and the properties of the RNs according to the functions and the characteristics which should be included in the respective RNs will be described as follows.

The L1 RN has only a physical layer and has a function for amplifying only the power of a signal and relaying the signal without performing a separate process and, more particularly, without decoding the received signal, when data is received from an eNB and is relayed to a User Equipment (UE). Even when a signal is transmitted in uplink, the signal received from a UE is relayed to the eNB without decoding the signal, and the transmission power thereof is properly adjusted (that is, amplified).

The L1 RN which is called a repeater is characterized in that a time delay hardly occurs or is very short in communication between the eNB and the UE using the RN since the RN does not decode the signal. In addition, since a special function is not added to the RN, when the UE communicates with the eNB via the RN, additional functions and signaling are not substantially necessary and thus the eNB and the UE can perform a transparent operation with respect to the RN. In contrast, the signal received by the RN actually includes an information signal and a noise signal. Therefore, when the RN simply amplifies the received signal and transmits the amplified signal, the noise signal is also amplified. Thus, the performance of the RN may be deteriorated.

Meanwhile, the L1 RN may be subdivided into an RN for relaying all received signals and a smart relay for selectively relaying the received signals. The smart RN relays a signal in a frequency-selective manner. In such an RN, a time delay of at least one Orthogonal Frequency Division Multiplexing (OFDM) symbol occurs. When the L1 RN is used in an LTE-A system, a device for adjusting power used for receiving and amplifying a signal and solving interference with another cell is necessary. For the smart RN, a downlink RS for measurement should be additionally defined because a channel quality information difference occurs due to the time delay.

The L2 RN has the functions of a physical layer and a link layer and, more particularly, a Medium Access Control (MAC) layer of the link layer, among layers defined in the Open Systems Interconnection 7 (OSI-7) layer. Since the L2 RN decodes a received signal and transmits the decoded signal, the L2 RN is called a Decode-and-Forward (DF) RN. Due to the DF operation, the noise signal is not amplified and transmitted when the RN relays the received signal, unlike Amplify-and-Forward (AF). Accordingly, since an Adaptive Modulation and Coding (AMC) scheme is applicable between the RN and the UE, the performance of the RN is improved.

However, a large time delay occurs when the eNB and the UE perform communication using the RN, due to the decoding operation of the RN. The L2 RN may have Hybrid Automatic Request (HARQ) and scheduling functions. This indicates that, when the RN decodes the received signal and relays the signal, the received signal is reconfigured and that a unique control channel of the RN is generated and transmitted.

Accordingly, a unique RS of the RN should be transmitted and countermeasures against the time delay should be provided. When the RN transmits the unique RS and the unique control channel, a method for operating the existing LTE UE is necessary. The L2 RN is characterized in that the RN decodes the received signal and transmits the decoded signal. The scheduling and HARQ functions may or may not be set according to cell configuration and system implementation.

That is, the L2 RN may have an independent scheduler. Alternatively, the L2 RN may not have a scheduler and the eNB may have a scheduler.

The L3 RN is an access point most similar to the eNB. Since the L3 RN has a unique cell ID similar to the eNB, a UE may not substantially distinguish between the eNB and the L3 RN.

The case where the eNB and the RN transmit signals using the same carrier frequency will be described first. The RN receives a downlink signal from the eNB and transmits the signal to the UE in downlink, using the downlink frequency of the eNB. In addition, the RN receives an uplink signal from the UE and transmits the signal to the eNB in uplink, using the uplink frequency of the eNB. Such an RN is called an in-band RN.

A separate frequency used by the RN may be allocated separately from the downlink and uplink frequencies of the eNB. That is, the RN receives the downlink signal from the eNB using the downlink signal of the eNB, and transmits the signal to the UE using the separate downlink frequency of the RN. Similarly, the RN transmits the signal to the eNB using the uplink frequency of the eNB, and receives the signal from the UE using the separated uplink frequency of the RN. Such an RN is called an out-of-band RN.

Additionally, similar to the out-of-band RN, a separate link between the RN and the eNB may be defined. Since the link between the eNB and the RN is a wired link and the link between the RN and the UE and the link between the eNB and the UE are wireless links, wireless resources between the eNB and the RN need not be considered.

Hereinafter, when the link between the RN and the eNB is wireless, the in-band RN will be described.

In order to perform the respective functions of the RN and the eNB, time-frequency resources for signal transmission are necessary. The performance improvement of the system due to the introduction of the RN can be accomplished depending on in which manner the RN and the eNB share the resources and how efficiently the resources are used. Schemes for allocating the time-frequency resources to the RN and the eNB may be broadly divided into two schemes: a Time Division Multiplexing (TDM) scheme for differently setting the service times of the RN and the eNB so as to use the resources and a Frequency Division Multiplexing (FDM) scheme for enabling the RN and the eNB to simultaneously provide services in a time unit but differently setting frequency resources. The RN used in the former case is called a Time Division (TD) RN and the RN used in the latter case is called a Frequency Division (FD) RN.

Figure 2:
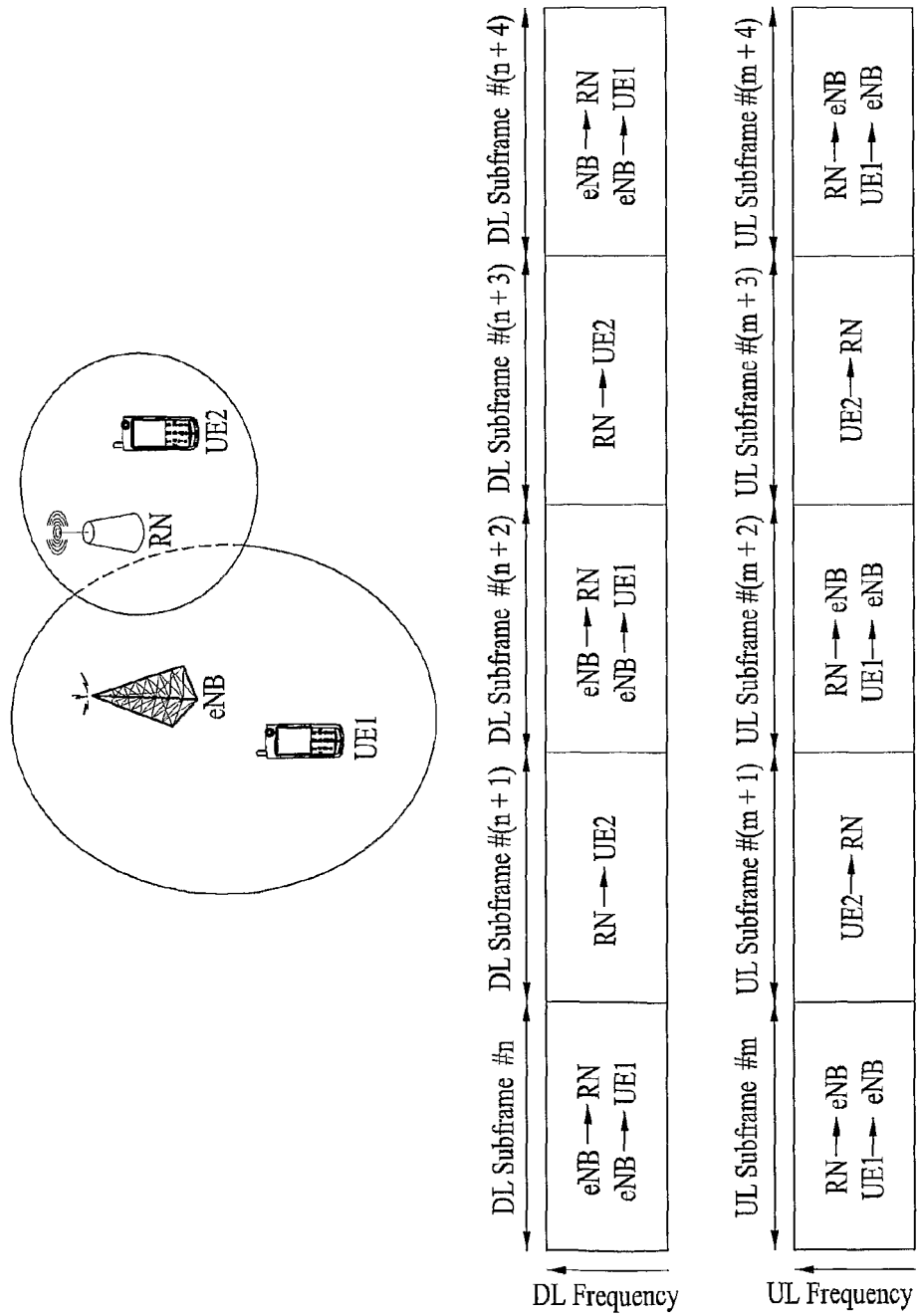
FIG. 2 is a view showing a resource allocation scheme between a relay node (RN) and a base station (eNB) if the RN is a Time Division (TD) RN.
Figure 3A:
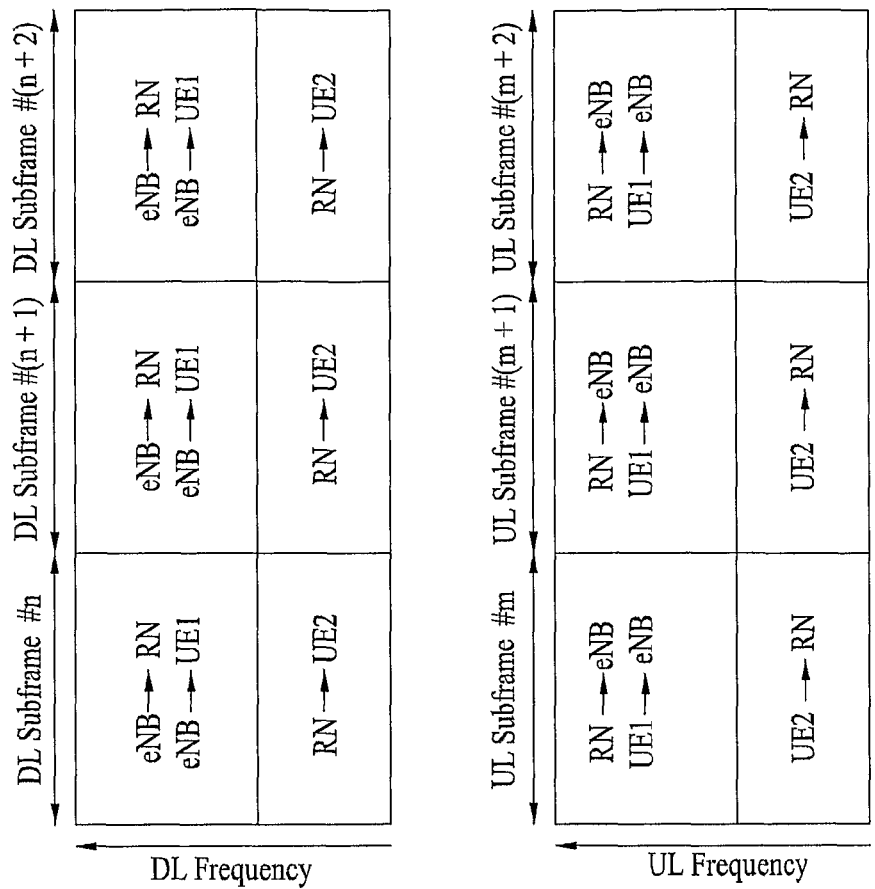
FIGS. 3a and 3b are views showing a resource allocation scheme between an RN and an eNB if the RN is a Frequency Division (FD) RN.
Figure 3A:
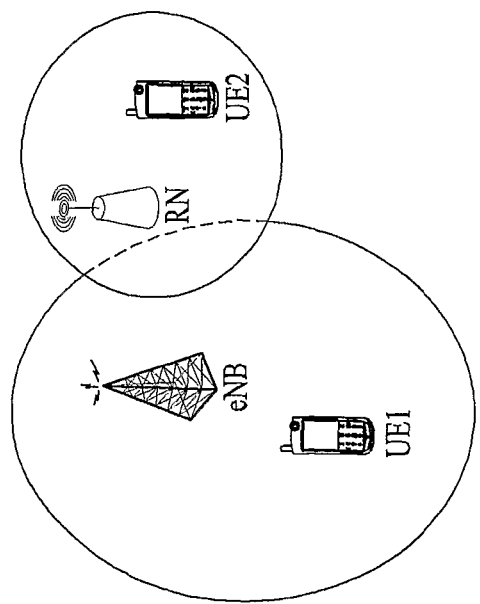
Figure 3B:
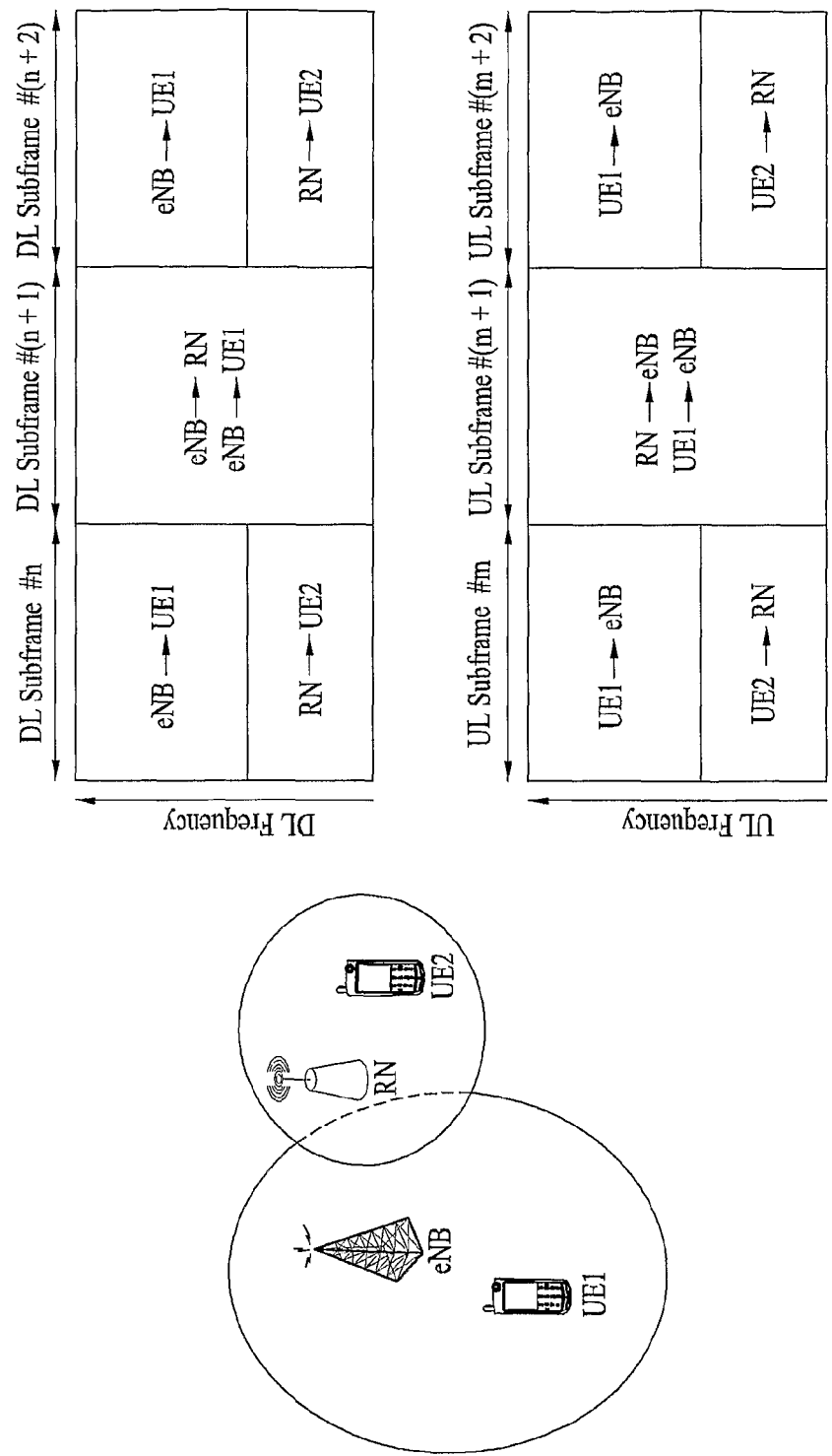

Each of the systems shown in FIGS. 2, 3a and 3b includes an eNB and one RN depending thereon. UE1 denotes a UE (one-hop UE) for directly receiving a service from the eNB, and UE2 denotes a UE (multi-hop UE) for receiving a service from the RN. The UE which receives the service from the RN is represented by a two-hop UE, a three-hop UE or the like according to via how many nodes or access points the signal is transmitted between the eNB and the UE. FIGS. 2, 3A and 3B show the subframe structure from the point of view of the cell of the RN.

FIG. 2 is a view showing a resource allocation scheme between an RN and an eNB if the RN is a TD RN. In the L2 and smart L1 RN, a subframe in which the eNB transmits signals and a subframe in which the RN transmits signals as well as transmission and reception subframes of the RN are temporally divided.

Hereinafter, a description will be given based on downlink. Since signals are transmitted or received to or from the UE2 in order of the eNB, the RN, and the UE2, this UE is a two-hop UE. The eNB transmits the signals to the RN and the UE1 in any subframe and the RN transmits the signals to the UE2 in another subframe.

In the L2 RN, if the RN simultaneously performs transmission and reception using the same frequency, a phenomenon, wherein the transmitted signal flows into a reception antenna in an RF front-end, occurs and thus interference occurs in the received signal.

A scheme for dividing a subframe in which the RN receives the signals from the eNB and a subframe in which the RN transmits the signals to the UE2 are suitable. Since the eNB and the RN share a cell ID, the TDM scheme for dividing a subframe in which the eNB transmits the signals to the UE1 and a subframe in which the RN transmits the signals to the UE2 is suitable.

Even in the L3 RN, since the RN cannot simultaneously perform transmission and reception using the same frequency, the TDM scheme for temporally dividing the transmission and reception subframes of the RN is suitable. In this case, a scheme for dividing subframes in which the eNB and the RN transmit respective signals need not be considered.

Hereinafter, the TD RN will be described concentrating on the L2 RN. The description will be given without considering the division of subframes, in which the RN transmits and receives the signals. The RN does not transmit the signals in a subframe in which the eNB transmits the signals, and the eNB does not transmit the signals in a subframe in which the RN transmits the signals. When the subframes used by the RN and the eNB are divided, in order to support the LTE UE, for example, in order to transmit RSs and signals of PDCCH regions such as Multicast Broadcast Single Frequency Network (MBSFN) subframes, the eNB transmits the signals in a region allocated thereto. At this time, how a time when the eNB and the RN transmit the signals in downlink is distributed may be determined according to the amount of downlink data of the eNB and the RN. The distribution scheme may be semi-statically changed with a predetermined period or may be allocated by the system in advance and signaled. Similarly, even in uplink, the eNB and the RN transmit the uplink signals in different time regions (e.g., subframes).

FIGS. 3a and 3b are views showing a resource allocation scheme between an RN and an eNB if the RN is an FD RN.

In FIGS. 3a and 3b, in downlink, a specific band is divided into a band in which the eNB transmits signals in downlink and a band in which the RN transmits signals in downlink. In FIG. 3a, the eNB transmits the signals to the RN and the UE1 in a specific band and the RN transmits the signals to the UE2 in another band. In this scheme, the signals can be transmitted and received using different resource blocks at the same time with the same carrier frequency. In FIG. 3b, the transmission time and the reception time of the RN are divided and the eNB and the RN can simultaneously transmit the downlink signals in different bands. This is because the scheme in which the RN receives the signals from the eNB and, at the same time, transmits the signals to the UE2 in another band may cause interference in the transmitted and received signals of the RN, even when the transmission and reception bands are different from each other. At this time, how the subframes in which the eNB and the RN transmit the data using the FDM scheme may be determined by the amount of data transmitted by the RN in downlink. The distribution scheme may be semi-statically changed with a predetermined period or may be allocated by the system in advance and signaled.

Subbands used by the RN may be dynamically or statically allocated. However, since the UEs which should receive the service from the RN should know resources used for transmitting the signal by the RN, the static allocation scheme is more suitable.

When the RN transmits the signals using the above-described scheme, it is difficult to use the structure of the existing RS and control channel information without change. Accordingly, a separate scheme satisfying backward compatibility should be considered.

Hereinafter, a scheme for transmitting downlink RSs of an RN when an eNB and the RN coexist in a cell of a mobile communication system will be described.

In the mobile communication system, the RS may be broadly divided into two types of RSs according to purpose: a common-RS for acquiring channel information and an RS used for data demodulation. The former is used for enabling a UE to acquire downlink channel information. Accordingly, the common-RS should be transmitted in a wideband, and even a UE which does not receive downlink data in a specific subframe can receive and measure this RS. In addition, the common-RS is also used for measurement of handover or the like. The latter is an RS which is transmitted together with resources when the eNB transmits downlink data. The UE may receive this RS so as to perform channel estimation and demodulate the data. This RS should be transmitted in a region in which data is transmitted.

For an operation such as channel information acquisition and handover between an RN and a UE (hereinafter, referred to as an "R-UE") which receives a service from the RN, the RN should transmit downlink RSs. Further, if the RN transmits unique control information, the unique RS of the RN is necessary for enabling the R-UE to receive this control information.

Hereinafter, an embodiment of the present invention, in which the RN and the eNB simultaneously transmit the downlink signals in one subframe, will be described. In this case, the eNB and the RN transmit the downlink signals in one subframe using different time-frequency resource regions. That is, the above-described FD RN (in FIGS. 3a and 3b) is used.

First, if the RN is the L1 RN, the RN transmits the signal received from the eNB to the R-UE without change. There is a need for determining with how much power the RN relays the signals received from the eNB and how interference with another cell is resolved. In the smart RN, since the RN can receive the signals from the eNB and transmit the signals after a time delay of at least one symbol, the RN can transmit the signals to the R-UE after at least one subframe.

However, since timing when the RN receives the signals from the eNB and timing when the RN transmits the signals to the R-UE are different, the channel information of a previous subframe and the channel information of a subsequent subframe may be different from each other. Due to this problem, even in the L1 RN, the unique downlink RSs of the RN are necessary. At this time, the RN transmits its unique RS in a range which does not influence the existing system. In the current LTE system, the control information channel transmission region (PDCCH) and the data information channel transmission region (PDSCH) of the eNB are temporally divided. In particular, the PDCCH should be transmitted in the entire band. However, since the FD RN is the RN using resources in a manner in which the eNB and the RN use different frequency regions in one subframe, the RN should not transmit any unique signal of the RN in the PDCCH region so as not to influence the existing LTE UE.

Alternatively, the unique signal of the RN should be transmitted in the above region within the range which does not influence the existing LTE UE, without causing interruption.

At the same time, in the data region allocated to the RN, it should also be determined whether the RSs of the eNB will be transmitted using the RS region allocated to the eNB. The RSs of the RN are necessary in the data region, in order to enable the R-UE to successfully receive the data transmitted by the RN. At this time, it is preferable that the RN transmit a dedicated RS. Accordingly, a plurality of dedicated RSs should be defined in one data region. This is because, in the LTE system, the dedicated RS is defined as a signal for a virtual antenna port, but the RN actually uses multiple antennas. In addition, the dedicated RSs need to be signaled using the plurality of virtual antenna ports.

Second, if the RN is the L2 RN, the RN transmits its unique RS, generates its unique PDCCH of the signals received from the eNB in consideration of the channel status between the RN and the R-UE, the amount of allocated resources, the amount of data to be transmitted and the like, and transmits the PDCCH and the PDSCH to the R-UE in a predetermined region. In this case, the RN should transmit the PDCCH in the entire band of a specific band allocated to the RN and should not damage the PDCCH transmission structure or the RS structure of the eNB.

At the same time, it should be determined whether the RS of the eNB will be transmitted in the data region allocated to the RN. Accordingly, the RS transmission structure of the RN is determined.

Since the L3 RN may have a unique cell ID, signals may be transmitted in the same band as the eNB. However, even in the L3 RN, the eNB and the RN may transmit the signals in a frequency division scheme if necessary, for an operation such as Inter Cell Interference Coordination (ICIC).

At the same time, it should be determined whether the RS of the eNB will be transmitted in the data region allocated to the RN. Accordingly, the RS transmission structure of the RN is determined.

Hereinafter, an RS transmission relationship between the eNB and the RN will be described with reference to FIGS. 4 to 6 as a scheme applicable to the L1, L2 or L3 RN in the case of the FD RN. The following drawings show the subframe structure from the point of view of the cell of the RN. An region after PDCCH transmission is a PDSCH region, which are time division multiplexed in a sub-frame. When the eNB transmits the PDCCH in the entire band, the PDCCH region is the region in which the eNB transmits control information, and may also be the region in which the RN may transmit the RSs and the PDCCH according to the design of the RSs of the RN and the kind of the RN. If the RN should receive the control/data information in PDCCH region transmitted by the eNB, the RN cannot transmit its PDCCH and RSs in the PDCCH region.

However, when the RN may not receive the control/dada information of the eNB in PDCCH region, the RN may transmit its control and RSs in the PDCCH region. In order to support the existing LTE UE, RN should transmit the PDCCH and RS in the PDCCH region in FIG. 1. The schemes shown in FIGS. 4 to 6 are the schemes in which the eNB and the RN share the PDSCH region by a FDM scheme. In different sub-bands of the PDSCH, the eNB and RN transmit their own the PDSCH accordingly.

Figure 4:
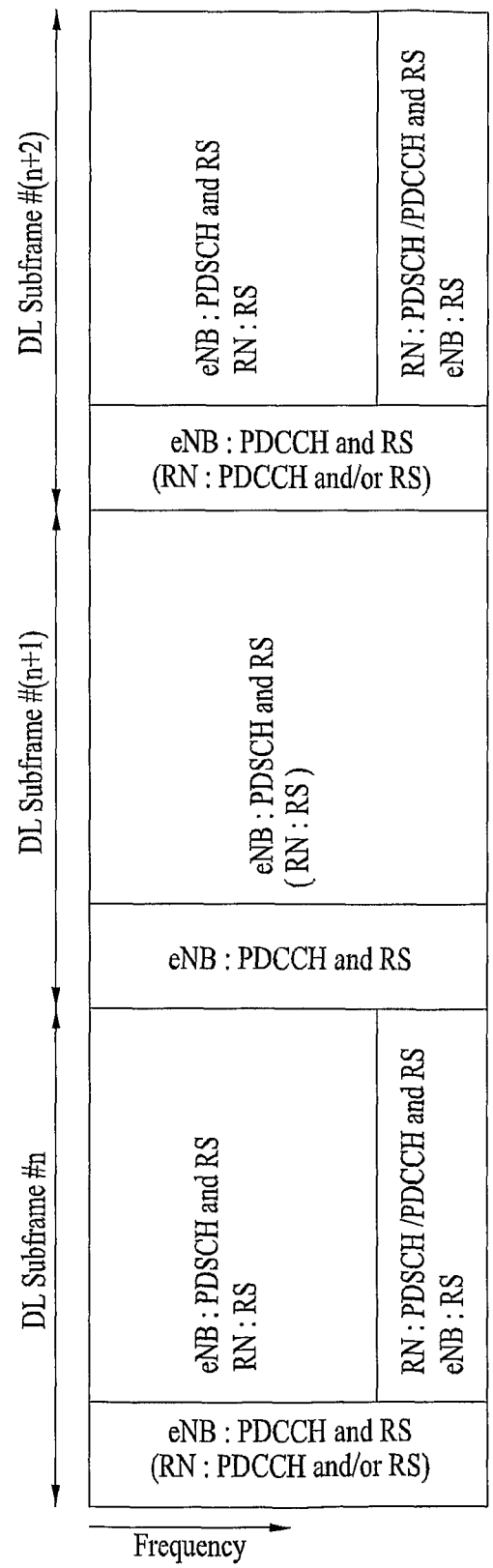
FIG. 4 is a view showing an example in which both an eNB and an RN transmit reference signals (RSs) in the entire band.

FIG. 4 is a view showing an example in which both the eNB and the RN transmit the RSs in the entire band of the PDSCH region. In this case, since the eNB and the RN can know the channel information of the entire band, handover between the RNs and between the eNB and the RN is easily performed.

Figure 5:
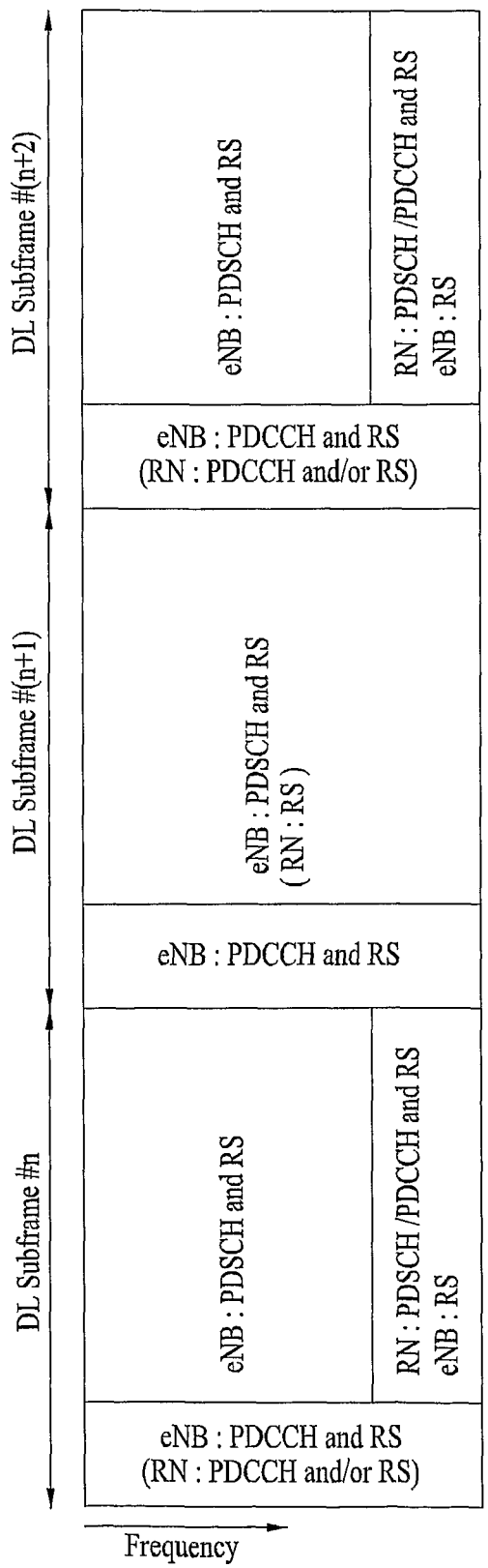
FIG. 5 is a view showing an example in which an eNB transmits RSs in an entire band but an RN transmits RSs only in its Physical Downlink Control Channel (PDCCH) and Physical Downlink Shared Channel (PDSCH) transmission allocation subbands.

FIG. 5 is a view showing an example in which the eNB transmits the RSs in the entire band but the RN transmits the RSs only in its Physical Downlink Control Channel (PD- CCH) and Physical Downlink Shared Channel (PDSCH) transmission allocation subbands. FIG. 6 is a view showing an example in which both the eNB and the RN transmit the RSs in the entire band in PDCCH region; however in PDSCH region they transmit their RS in their downlink signal transmission allocation regions only.

As shown in FIGS. 4 and 5, if both the eNB and the RN transmit the RSs in the region in which the RN transmits data and both the RN and the eNB transmit the common-RSs.

Alternatively, as shown in FIG. 4, if subframes are divided into a subframe in which both the RN and the eNB transmit the signals using the FDM scheme and another subframe in which only the eNB transmits the signals (the subframe in which the RN receives the signals) and the RN and the eNB transmit the common-RSs, the RN and the eNB may transmit the RSs using different schemes. That is, in the subframe in which the RN and the eNB simultaneously transmit the signals, the eNB may transmit the RSs for some of the antenna ports and the RN may transmit the RSs for the antenna ports of the RN using RS resources for the remaining antenna ports of the eNB. In the subframe in which only the eNB transmits the signals (the subframe in which the RN receives the signals), the eNB transmits the RSs for all the antenna ports.

In contrast, as shown in FIG. 5, if the eNB transmits the RSs in the entire band but the RN transmits the RSs only in the allocated frequency band, the eNB transmits the RSs for all the antenna ports in subbands in which the eNB transmits the signals, and the eNB transmits the RSs for some of the antenna ports in subbands allocated to transmit the signal of the RN. In this case, the RN may transmit the RSs for the antenna ports of the RN using the RS resources for the remaining antenna ports of the eNB.

Figure 6:
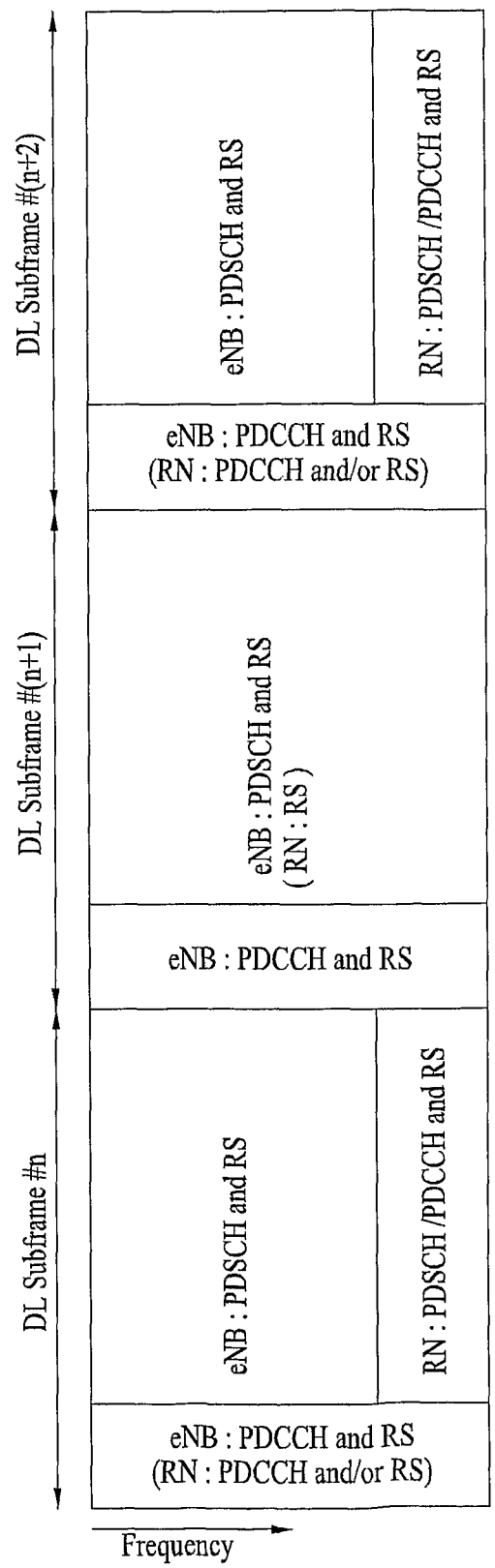
FIG. 6 is a view showing an example in which both an eNB and an RN transmit RSs only in their downlink signal transmission allocation regions.

As shown in FIG. 6, if the RN and the eNB are frequency-division-multiplexed in one subframe and RS transmission regions are also frequency-division-multiplexed, the eNB transmits the RSs for all the antenna ports in a region allocated to the eNB and the RN transmits the RSs for all the antenna ports. In FIG. 6, since the RS signal transmission regions of the eNB and the RN are different from each other according to the PDCCH and the PDSCH, these regions need to be signaled to the UE.

In FIG. 4, the subframe in which the RN and the eNB transmit the signal using the FDM scheme should be reported to all UEs by signaling, and the frequency of the subframe is determined according to the number of UES which receive the service from the RN and the amount of data. If the period of the subframe is significantly long, that is, if a time from a subframe to a next subframe, in both of which the eNB and the RN are frequency-division-multiplexed, is significantly long, separate RSs are necessary. If the RN needs to perform channel measurement in the subframe in which the eNB transmits the PDSCH in the entire band, the wideband RS transmission of the RN should be allowed.

In this case, it should be allowed to set the transmission period of the wideband RSs of the RN and the period in which the eNB and the RN are frequency-division-multiplexed differently from each other, and signaling thereof should be defined. At this time, when the RN transmits the RSs in the subframe in which the eNB transmits the PDSCH in the entire band, the RN may transmit the RSs for the antenna ports of the RN using some RSs designed for the antenna ports of the eNB.

Meanwhile, it is preferable that the RN does not transmit any signal in the resource element region in which the eNB actually transmits the RSs and transmits a signal indicating that no signal is transmitted to UEs which receive services from the RN.

Third, a wired link between the RN and the eNB is considered. In this case, since information transmission between the RN and the eNB uses separate radio resources, the eNB and the RN may appear to be one component. At this time, channel information of the link between the RN and the R-UE is necessary. The RN may transmit its unique RSs, but may not transmit its unique PDCCH. That is, it is assumed that a transmission delay does not substantially occur between the eNB and the RN. In this case, every UE decodes the PDCCH generated by the eNB so as to obtain its control information. The RN needs to transmit only its RSs without transmitting the PDCCH or transmit its RSs while relaying the PDCCH generated by the eNB.

At this time, it is preferable that the RN does not transmit any signal in a region in which the eNB transmits RSs. In this case, RSs for data demodulation should be in the format of dedicated RSs, and a plurality of dedicated RSs should be defined according to the number of antenna ports of the RN. In addition, the dedicated RSs need to be signaled using the plurality of virtual antenna ports. In addition, wideband RSs for measurement should be transmitted without damaging the existing structure. At this time, a scheme for using null-CCE of a PDCCH region, a scheme for transmitting RSs using one OFDM symbol in one subframe or the like may be used.

Hereinafter, the case where a TD RN is used in an L2 or lower RN will be described. If the TD RN is used in the L2 or lower RN, since the eNB and the RN have the same cell ID, subframes are divided into a subframe in which the RN transmits signals and a subframe in which the eNB transmits signals. In the following description, a subframe in which the RN should receive signals from the eNB is not considered. The subframe structure in which the eNB and the RN transmit the signals may be largely divided into two modes. The eNB transmits its RSs and PDCCH in every subframe.

Generally, the RN does not need to receive the RSs and the PDCCH of the eNB in the subframe in which the RN transmits data, but may receive the RSs and the PDCCH of the eNB in every subframe according to the kind and the function of the RN (L1 or L2 wired RN). If the signals of the eNB do not need to be received in the subframe in which the RN transmits the signals, the RN may transmit its RSs and PDCCH in the PDCCH region.

The scheme for transmitting the signals in the PDSCH region may be performed according to signaling and a predetermined method. Alternatively, a scheme for dividing subframes into a subframe dedicated to the RN and a subframe dedicated to the eNB or a scheme for classifying subframes into an LTE subframe and an LTE-A subframe may be used. In the former scheme, an LTE UE may perform an operation such as measurement in all subframes. That is, an MBSFN operation may be performed in an LTE system. In the latter scheme, the LTE UE is disabled to receive a service in a specific subframe.

First, the RS and PDCCH transmission structure of the eNB in the former scheme will be described. The eNB transmits the RSs and the PDCCH in every subframe of the PDCCH region. All the UEs which receive the service from the eNB may receive and demodulate these signals and perform an operation such as measurement using the signals. The eNB may transmit the RSs of the PDCCH and the PDCCH in the subframe allocated to the RN while transmitting the PDCCH and the PDSCH in a specific subframe allocated for transmission of its signals. However, no signal including RSs may be transmitted in the PDSCH region. That is, the UE which directly receives the service from the eNB may receive the signals of the eNB in all the subframes, but it is necessary for the UE not to measure and receive the RSs in the data region of the subframe allocated to the RN.

In contrast, the subframe structure may be designed such that the eNB does not transmit any signal in the subframe allocated to the RN. In this case, when the RN transmits the signals in the given subframe, the RN may transmit the signals without being restricted by the structure of the signals transmitted by the eNB. At this time, if the RN is the L2 RN, the RN may generate a unique PDCCH and transmit signals in the format similar to the existing LTE system.

In the latter scheme, entire subframes are not temporally divided from the point of view of the eNB and the RN, but are temporally divided into subframes for supporting the LTE system and the LTE-A system. The signaling of the subframes may be performed similar to the signaling of the subframes of the RN. That is, the subframes are divided into a subframe in which an LTE UE receives a service from the eNB and a subframe in which an LTE-A UE receives a service from the eNB or the RN, and are signaled to the UE periodically or with a specific pattern. Such a scheme for dividing the subframes may be free from the restraint that the RN should support the LTE UE. This is because the LTE-A UE is newly designed so as to recognize the RN and the RN provides a service only in a subframe defined as the LTE-A subframe.

Figure 7:
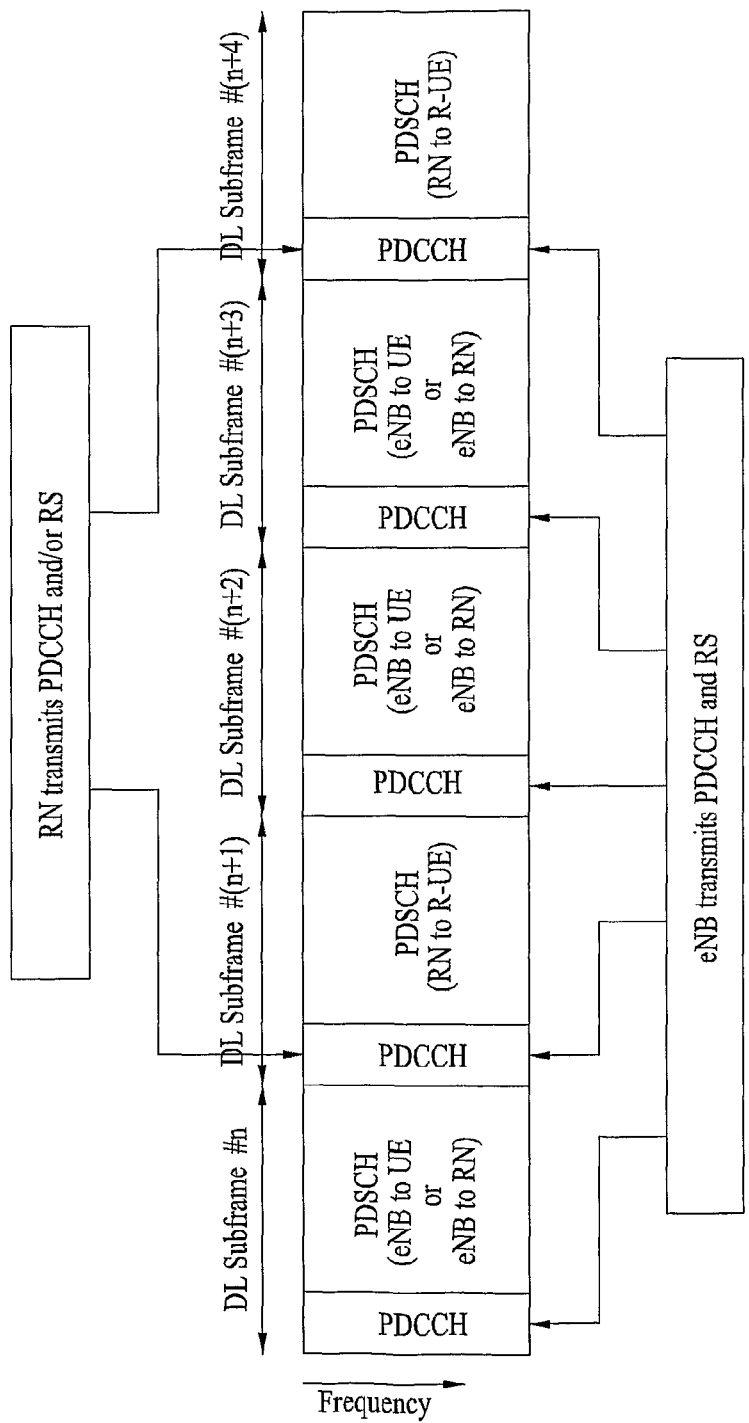
FIGS. 7 and 8 are views showing a relationship between RS transmission and control information transmission of an eNB and an RN if a TD RN is used.
Figure 8:
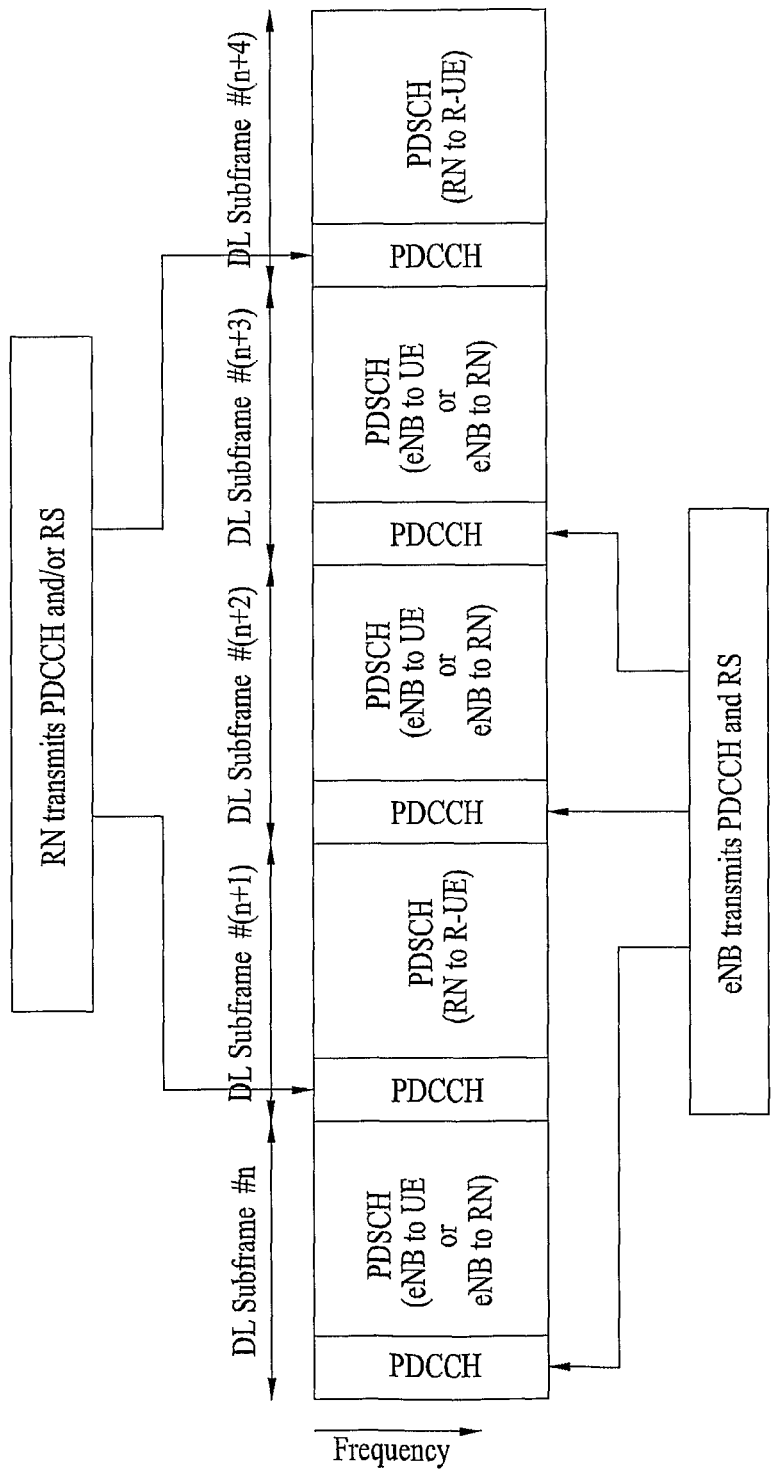

FIGS. 7 and 8 are views showing a relationship of RS transmission and control information transmission between an eNB and an RN when a TD RN is used.

FIG. 7 shows a scheme in which the RN and the eNB transmit signals using the TDM scheme and the eNB may transmit a minimum amount of signals even in the subframe of the RN. In this case, the eNB transmits the PDCCH and the RSs in all subframes, but the RN transmits the PDCCH and the RSs only in the subframe allocated to the RN. The RN should transmit the PDCCH and the wideband RS only in the subframe allocated to the RN without colliding with the PDCCH and the RS transmitted by the eNB and thus a design therefor is necessary. The RN may transmit the common-RSs in the subframe allocated thereto of the PDSCH region using the same scheme as the RS transmission scheme for the antenna ports of the eNB. The RN and the eNB transmit the common-RSs in different subframes while sharing the same RS sequence. The RS sequence is shared in the same subframe, but an entity for transmitting the RSs in the PDCCH region and an entity for transmitting the RSs in the PDSCH region are different from each other.

In FIG. 8, the RN and the eNB transmit the signals using the TDM scheme and the eNB does not transmit any signal in the subframe allocated to the RN, unlike FIG. 7. In this case, the RN may use the PDCCH and RS structure of the existing RN without change. The RN and the eNB transmit the common-RSs in different subframes while sharing the same RS sequence.

If the period of the subframe in which the RN transmits the signals is significantly long, that is, if a time from a subframe to a next subframe, in both of which the eNB and the RN are frequency-division-multiplexed, is significantly long, separate RSs are necessary. If the RN needs to perform channel measurement in the subframe in which the eNB transmits the PDSCH in the entire band, the wideband RS transmission of the RN should be allowed. At this time, when the RN transmits the RSs in the subframe allocated to transmit the PDSCH by the eNB, the RN may use some RSs designed for the antenna ports of the eNB for transmitting the RSs for the antenna ports of the RN.

Figure 9:
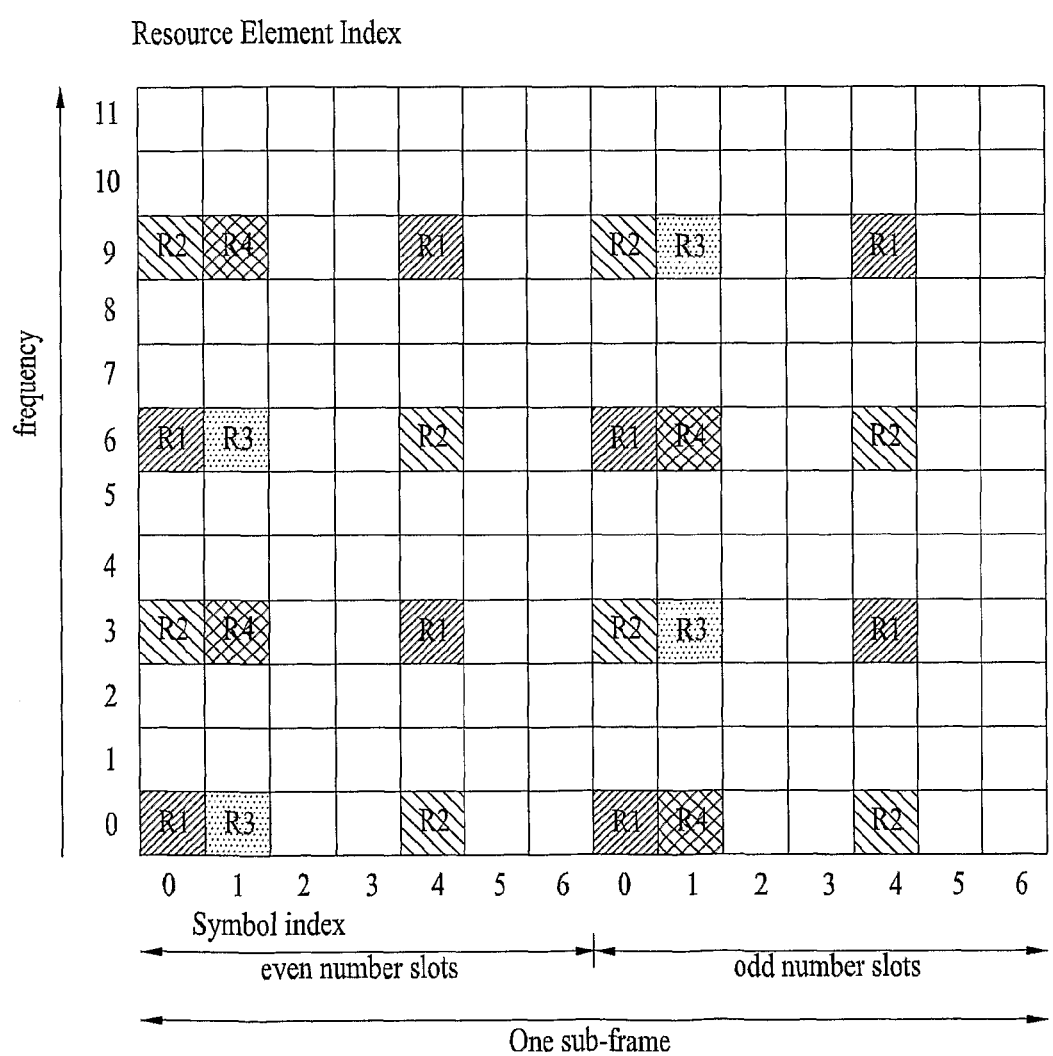
FIG. 9 is a view showing a downlink RS structure defined in the LTE.

FIG. 9 is a view showing downlink RS structure defined in the LTE.

FIG. 9 shows one resource block, in which a horizontal axis denotes a time axis and a vertical axis denotes a frequency axis. One resource block is composed of one subframe in the time axis and is composed of 12 subcarriers in the frequency axis. One subframe is composed of two slots and each of the slots is composed of 7 symbols (in a normal CP). The number of transmission antenna ports supported by the eNB is 4, and resource element regions used for the transmission of the RSs for antenna ports 1 to 4 are respectively denoted by R1 to R4. An interval in which a PDCCH is transmitted in one subframe is spread to symbol intervals from a slot index 0 to a slot index 4 in the time axis and to the entire band in the frequency axis.

In the current 3GPP LTE system, the number of transmission antenna ports supported by the eNB is a maximum of 4, and respective common-RSs are defined with respect to the four antennas on the time-frequency region. In an LTE-Advanced (LTE-A) system evolved from the LTE system, a maximum of eight transmission antenna ports needs to be supported. The respective common-RSs of the eight antennas should be defined in the specification in order to enable the UE to successfully receive control information and data transmitted from the eight antennas. That is, four RSs should be additionally defined. The RSs of the RN should be designed so as not to overlap with the RSs of the eNB. Accordingly, overhead for the downlink RSs may be undesirably increased.

Accordingly, in one embodiment of the present invention, if the RN is used in such a system, the RN transmits the RSs using some RSs which are previously designed for transmission of the RSs of the eNB. That is, if M>N>0, in the system in which the eNB has total M antenna ports and the RN has N antenna ports, the eNB transmits the RSs for (M-N) antenna ports in a specific time-frequency region and the RN transmits the RSs of the RN in an RS region defined for the N antenna ports defined for the eNB.

For example, if the RN is an FD RN and the numbers of transmission antennas of the eNB and the RN are respectively 8 and 4, the transmission antenna ports of the eNB are denoted by 1 to 8 and the four transmission antenna ports of the RN may be denoted by 9 to 12. At a point of time and a band in which the eNB and the RN transmit the signals in downlink simultaneously, the eNB transmits the RSs only for some of the eight antenna ports. For example, when the RSs for the antenna ports 1 to 8 of the eNB are mapped to R1 to R8, the eNB transmits R1 to R4 for the four antenna ports and transmits R9 to R12 for the antenna ports 9 to 12 of the RN in the R5 to R8 regions.

Figure 10:
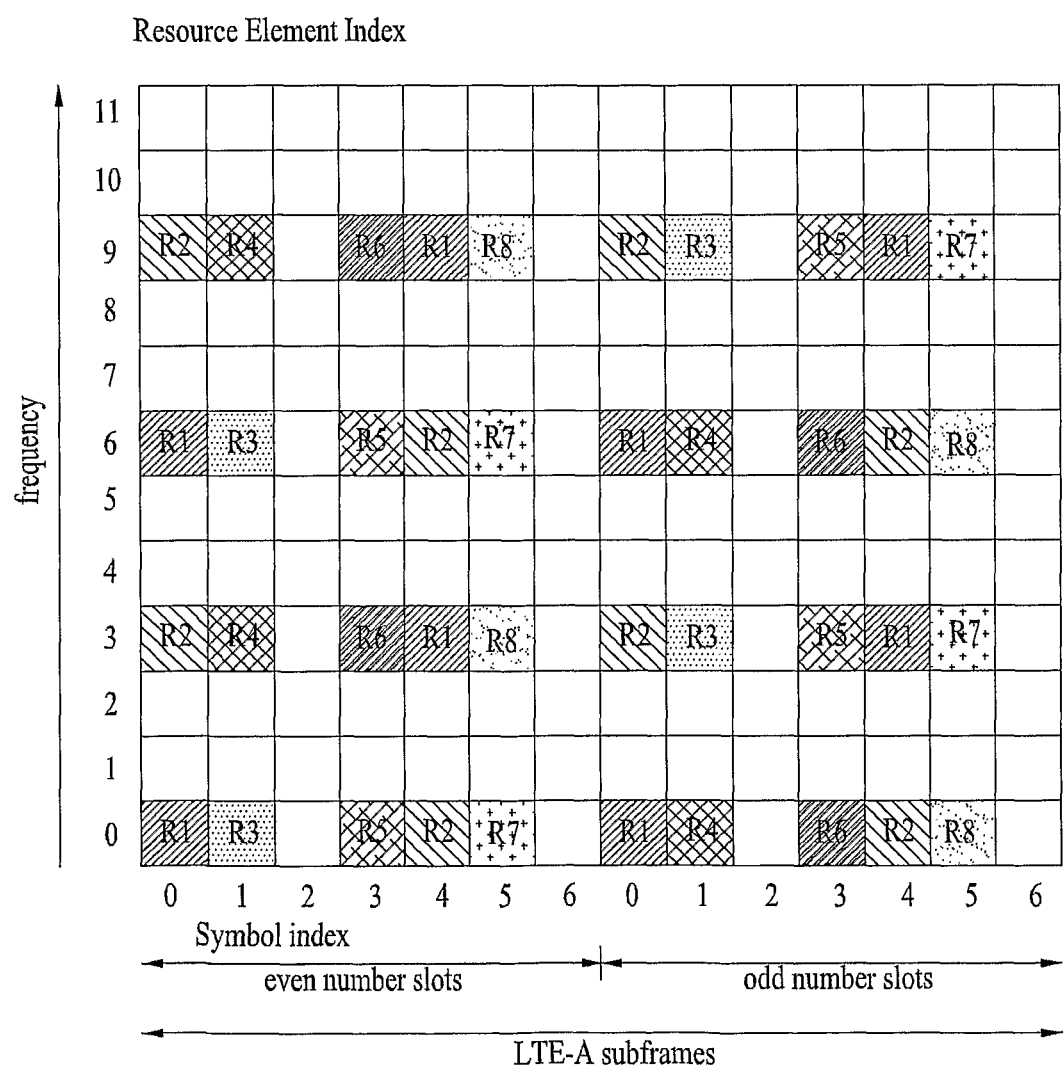
FIG. 10 is a view showing an example of a method for transmitting RSs according to an embodiment of the present invention.

FIG. 10 is a view showing an example of downlink RS structure in an LTE-A system.

In a time-frequency region in which the eNB and the RN simultaneously transmit the RSs, if the number of antenna ports of the eNB is 8 and the number of antenna ports of the RN is 4, the R-UEs which receive the service from the RN should recognize R5 to R8 as the antenna ports R9 to R12 of the RN. The RN does not transmit any signal in the resource element region in which the eNB transmits the RSs and the eNB does not transmit the signal in the resource element region in which the RN transmits the RSs.

Information associated with such scheduling is preferably transmitted to the UE. Accordingly, separate signaling for transmitting the information associated with the scheduling may be used.

Figure 11:
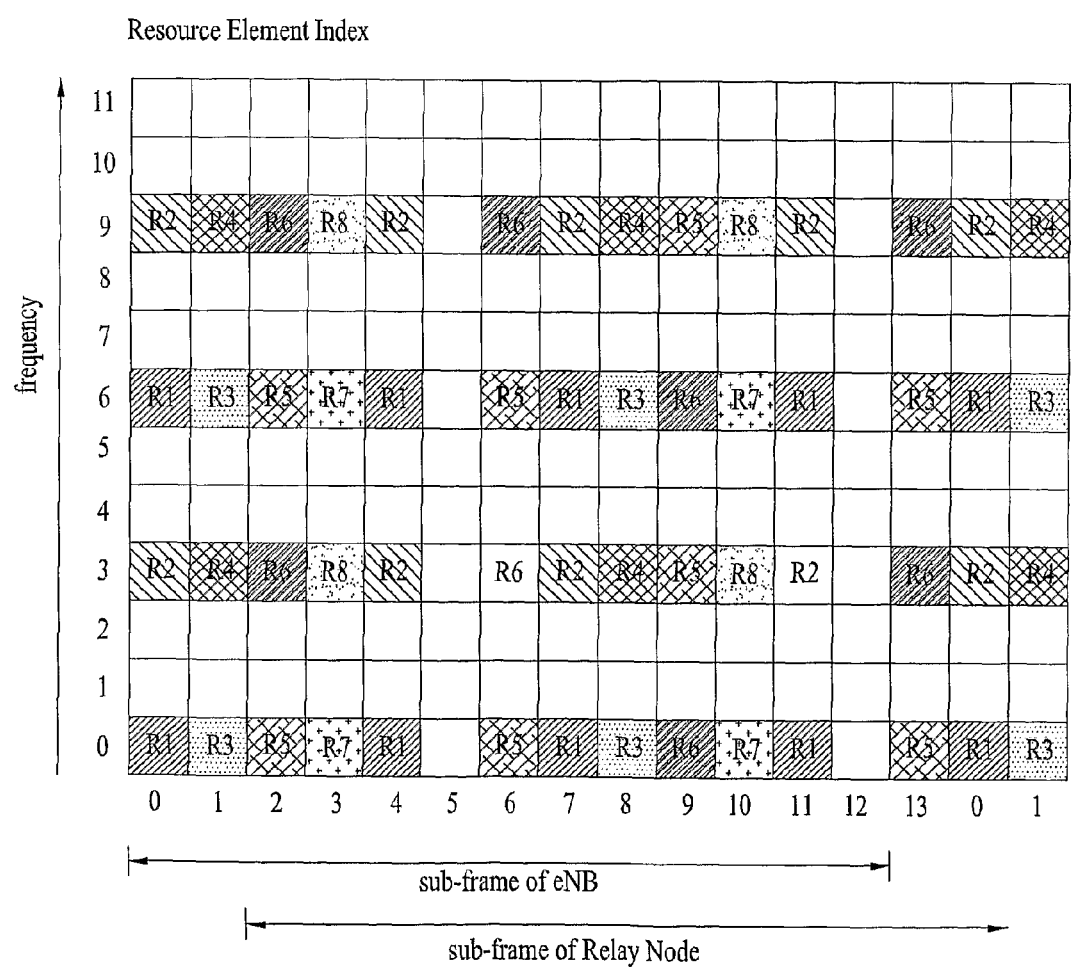
FIG. 11 is a view showing an example of a method for transmitting RSs according to another embodiment of the present invention.

FIG. 11 is a view showing an example of a method for transmitting RSs according to another embodiment of the present invention.

In FIG. 11, it is assumed that the eNB has eight antenna ports. R5 to R8 are designed with patterns similar to R1 to R4. The RN preferably signals a time delay of a start point of a subframe to the R-UEs. The R-UEs recognize the subframe and receive the signals from the delayed time according to the information about the time delay received from the RN.

The above-described method for transmitting the RSs in the subframe in which the eNB and the RN simultaneously transmit the signals will be described.

In FIGS. 4 to 6, the eNB transmits the PDCCH in the entire band, and the RN may transmit the RS and the PDCCH in the PDCCH region according to the design of the RSs and the kind of the RN.

As shown in FIG. 4, if the RN and the eNB are frequency-division-multiplexed in one subframe and both the eNB and the RN transmit the RSs in the entire band, the eNB transmits R1 to R4 for the antenna ports 1 to 4 and the RN transmits R9 to R12 for the antenna ports 9 to 12 in the R5 to R8 regions.

In the subframe in which the eNB and the RN simultaneously transmit the signals, the RN transmits its RSs using the RSs designed for the antenna ports of the eNB. However, in the subframe in which only the eNB transmits the signals, the eNB preferably transmits the RSs for all the antenna ports. Accordingly, the RSs of the eNB are changed depending on in which subframe the RN transmits the signals. Since signaling for time resource sharing with the eNB is already added, the UE may be informed of how the RSs of the eNB are changed according to the subframe by signaling.

As shown in FIG. 4, if the RN transmits the common-RS even in the region allocated for data transmission of the eNB, the transmission of the common-RSs by the RN in every subframe leads to resource waste. Accordingly, even when the RN uses the RS region of the eNB, the subframe in which the RN transmits the common-RSs is preferably restricted. For example, the RN may transmit the common-RSs in the data transmission region of the eNB according to a specific pattern or in every $P^{th}$ (P>0) subframe. The P value needs to be signaled to all the UEs in a cell. The eNB and the RN simultaneously transmit the RSs in a frequency band allocated to the eNB in a subframe allocated thereto. Accordingly, the UE which receives the service from the eNB in a band allocated thereto receives/decodes a predetermined number (R1 to R4 in the example of FIG. 11) of RSs, and the UE which receives the service from the RN receives RSs of R5 to R8 and measures the channel status.

In the other subframes, the UE which receives the service from the eNB receives/decodes the RSs for all the antenna ports, and the UE which receives the service from the RN does not receive the RSs in a band allocated thereto.

As shown in FIG. 5, if the RN and the eNB are frequency-division-multiplexed in one subframe, the eNB transmits the RSs in the entire band, and the RN transmits the RSs only in the allocated frequency band, the RSs may be transmitted using the scheme similar to the scheme of FIG. 4. That is, the eNB transmits the RSs for all the antenna ports in the region allocated to the eNB, and the RN transmits the RSs for the antenna ports R9 to R12 using the RSs for the antenna ports R5 to R8 of the eNB in the band in which the eNB and the RN coexist.

In contrast, as shown in FIG. 6, if the RN and the eNB are frequency-division-multiplexed in one subframe and the RS transmission regions are also frequency-division-multiplexed, it is preferable that the eNB transmit the RSs for all the antenna ports in a region allocated thereto and that the RN transmit the RSs using the RS resources for all the antenna ports of the eNB in the RN transmission regions. For example, if the eNB and the RN respectively have eight antenna ports and four antenna ports and the RSs for the antenna ports are denoted by R1 to R8 and R9 to R12, the eNB transmits R1 to R8 in the region in which the eNB transmits data. The RN transmits the RSs for R9 to R12 in the region defined for R1 to R4 of the region in which the RN transmits data. The RS region of the eNB used by the RN may be changed according to the choice of those skilled in the art. For example, the RN may transmit its RSs using the region for R5 to R8 of the region in which the RN transmits data. Meanwhile, since the RS transmission regions of the eNB and the RN are different from each other in the PDCCH and the PDCCH, a separate signal therefor needs to be transmitted to the UE.

If the above-described RS transmission scheme is used, the RSs of the RN for data demodulation may not be transmitted in the format of the dedicated RSs.

Even if the RN is a TD RN, the above-described RS transmission scheme is applicable. In the TD RN shown in FIG. 7, the eNB transmits the RSs and the PDCCH even in a subframe in which the RN transmits signals. In this case, the eNB transmits the RSs (RSs transmitted in the PDCCH region, R1 and R2) in a manner defined only in an appointed OFDM symbol interval. The eNB does not transmit any signal and only the RN transmits signals including the RSs, in the remaining PDSCH region. At this time, if the number of antenna ports of the RN is four, the RSs for the antenna ports 9 to 12 of the RN may be transmitted in the region of R1 to R4. The RSs for the ports 9 to 12 may be transmitted in the regions for R5 to R8 according to the choice of those skilled in the art. An L2 RN may generate the PDCCH and transmit signals.

Meanwhile, the RN should transmit the RSs in the region excluding the OFDM symbol interval in which the eNB transmits the RSs and the PDCCH. Since the above-described scheme is similar to the MBSFN subframe scheme, the LTE UEs receive the RSs and the PDCCH in a predetermined OFDM symbol and maintain the link with the eNB even if the eNB does not transmit downlink data. Thus, the channel estimation of the UEs is not interrupted. Even in this case, it is preferable that the RS sequences used when the RN and the eNB transmit the RSs in one subframe be the same. Meanwhile, the eNB or the RN may inform the UE of a point of time when the signals should be received and decoded.

Meanwhile, if the eNB transmits signals in several specific OFDM symbol intervals in the subframe allocated to the RN and the number of symbols transmitted by the eNB in the subframe is always limited to two, the RN may transmit RSs using the scheme shown FIG. 11. If the RN transmits the RSs using the scheme shown in FIG. 11, the R-UE may recognize as if the RSs for R1 to R4 defined in the LTE are received.

In the TD RN shown in FIG. 8, the eNB does not transmit signals in the subframe allocated to the RN. Accordingly, in the subframe in which the eNB transmits the signals, the RSs for all the antenna ports are transmitted in the regions for R1 to R8. In this case, in the subframe in which the RN transmits the signals, the RSs for the antenna ports 9 to 12 are transmitted in the regions for R1 to R4 or the region for R5 to R8.

If the RN always transmits the RSs for the antenna ports 9 to 12 in the region in which the RSs for R1 to R4 are defined, the RN can be operated similarly to the existing LTE system. Thus, the existing LTE UEs may receive a service from the RN without significantly changing the existing system.

In another embodiment of the present invention, the RSs of the RN are transmitted using one symbol. That is, the RN transmits wideband RSs of the RN using one symbol in a specific subframe.

In the current LTE system, the RSs or system information is not transmitted using a last downlink symbol. Accordingly, for example, if the RSs of the RN are transmitted using the last symbol, it is possible to minimize an influence on the LTE system.

Alternatively, RSs for measurement of the RN are transmitted using one symbol in a subframe, and RSs necessary for demodulating the data of the RN by the UE may be transmitted in the format of the dedicated RSs defined in the LTE system.

The above-described scheme is applied to the case where the RN and the eNB transmit common-RSs (wideband RSs) in the same time-frequency region. The above-described scheme may be applied to a wired RN, an FD RN or a TD RN in which the eNB and the RN are wired-linked.

Hereinafter, another embodiment of the present invention will be described in association with the FD RNs of FIGS. 4 to 6.

First, the above-described scheme is applied to the case where the regions, in which the RN and the eNB transmit the RSs, overlap with each other. That is, the above-described scheme is applied to the case where the eNB should transmit the common RSs and the RN should transmit wideband RSs in a specific time-frequency region. The RSs for data demodulation of the RN should be transmitted separately from the wideband RSs. If the wideband RS transmission of the RN for an operation such as channel estimation and handover is necessary in addition to the region in which the RN transmits the data, the wideband RSs of the RN may be transmitted using the above-described scheme. Accordingly, another embodiment of the present invention is applicable to the L1 RN or the L2 RN in which the PDCCH of the RN is transmitted only in a specific band allocated to the RN.

The above-described scheme is applicable to the case where the wideband RSs of the RN are periodically or non-periodically transmitted for an operation such as channel estimation and handover of the TD RN in the subframe in which the eNB transmits the signals.

According to another embodiment of the present invention, since the eNB and the RN transmit the RSs in one subframe, the RSs of the RN are transmitted at a position which does not overlap with the resource element region in which the eNB transmits the RSs.

Figure 12:
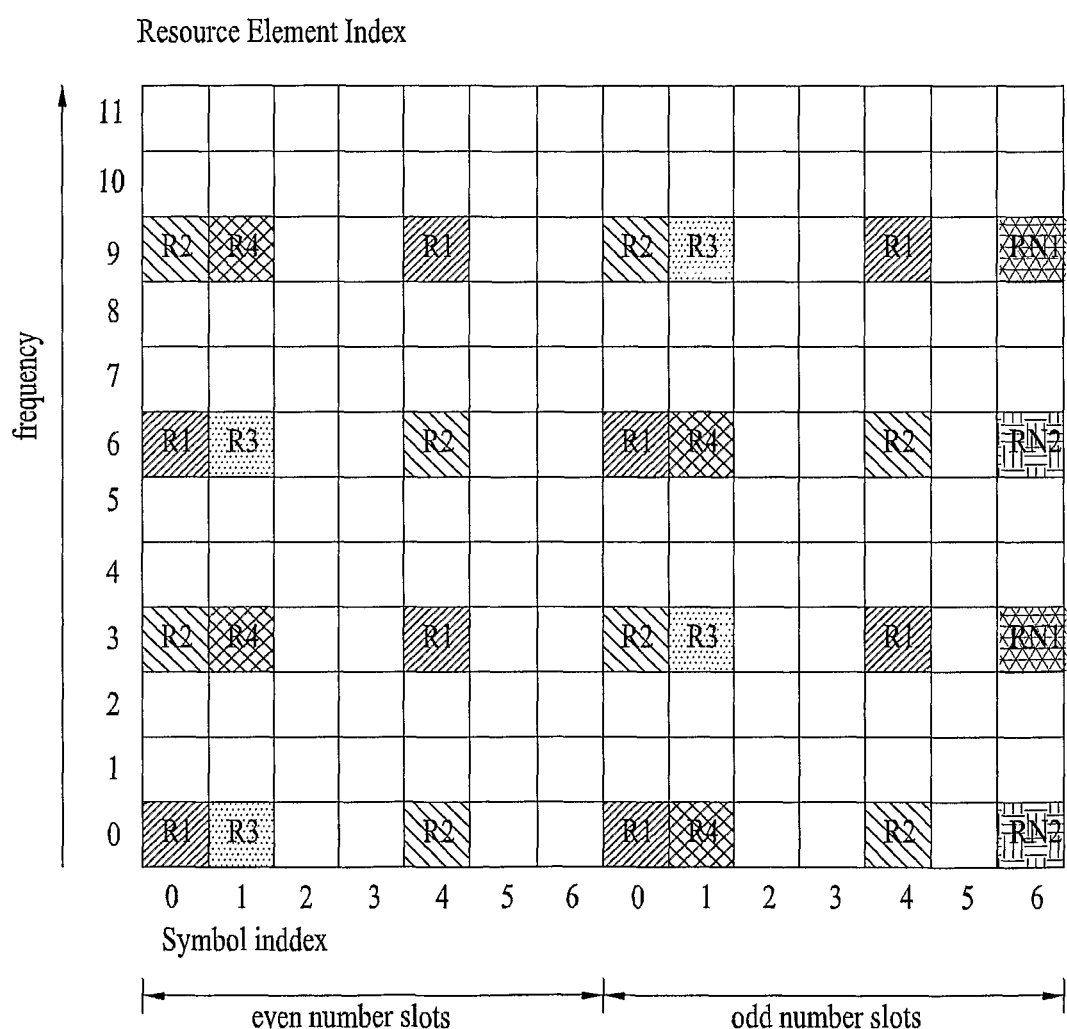
FIG. 12 is a view showing an example of an RS transmission structure in an entire band when an eNB transmits RSs in the entire band and an RN transmits wideband RSs in the entire band.

FIG. 12 is a view showing an example of an RS transmission structure in the entire band when the eNB transmits RSs in the entire band and the RN transmits the wideband RSs in the entire band, if the number of antennas of the RN is two.

If the RN transmits the RSs of the RN only in the resource region allocated for RN signal transmission, the downlink RSs have the format of FIG. 12 in the resource region and have the format of FIG. 9 in the region in which the eNB transmits the signals.

In FIG. 12, the RSs of the RN are transmitted using the last symbol of the subframe. In FIG. 12, RN1 denotes the RS of the antenna 1 of the RN and RN2 denotes the RS of the antenna 2 of the RN. If the RN transmits data using two or more transmission antennas, the RSs for the antennas 3 and 4 may be transmitted between the resource elements for transmitting RN1 and RN2.

When a plurality of RNs exists in one cell, the last symbol may be used for transmitting the RSs.

Figure 13:
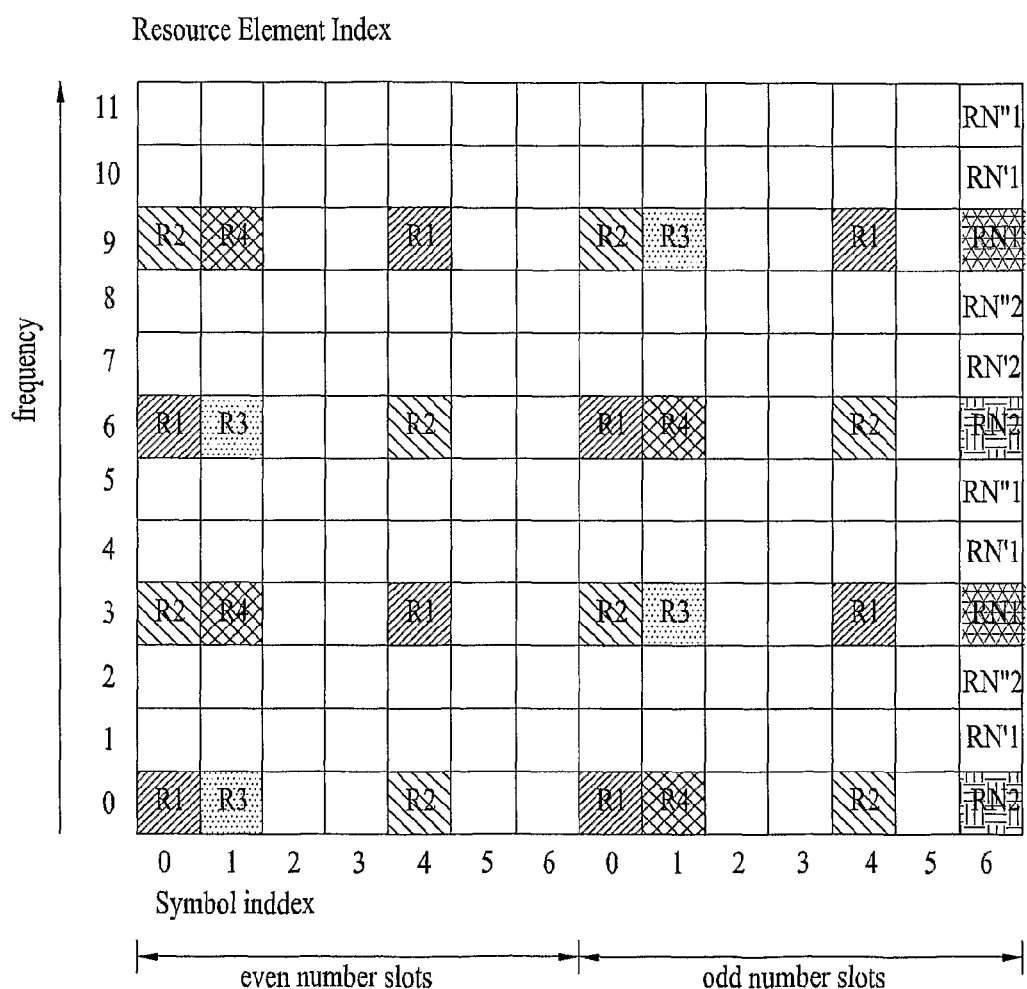
FIG. 13 is a view showing an example in which three RNs simultaneously transmit RSs for two antennas.

FIG. 13 is a view showing an example in which three RNs simultaneously transmit RSs for two antennas.

RN, RN' and RN" denote three different RNs, respectively. RN1 denotes an RS for an antenna 1, and RN2 denotes an RS for an antenna 2. FIG. 13 is only exemplary. Even when the number of antennas is two or more, the RS structure may be modified and applied.

If the number of RNs is too large or the number of antennas of the RN is too large to transmit RSs using the last symbol of a subframe, the RSs may be transmitted in a state of being divided into two or more subframes. For example, the RSs for the antennas 1 and 2 may be transmitted using even number subframes and the RSs for the antennas 3 and 4 may be transmitted using odd number subframes.

If the last symbol is used for transmitting the RSs by the RN in every subframe, resources may be wasted. Accordingly, it is preferable that the subframe in which the RN transmits the RSs be allocated every $P^{th}$ (P is any integer) subframe or be allocated in another manner negotiated with the RN. Information indicating how frequently the RSs of the RN are transmitted, that is, the P value, should be transmitted by an appointed signal among the eNB, the RN and the UEs which receive a service from the RN. In this case, the eNB does not transmit any signal in the resource element region in which the RN transmits the RSs. Similarly, the RN does not transmit any signal in the resource element region in which the eNB transmits the RSs. At the same time, the RN needs to inform the R-UE of information about the resource element region and the OFDM symbol number in which the RN transmits the RN.

Meanwhile, if the RS transmission period is too long or a channel variation is too large when the UE which receives the service from the RN measures the RSs of the RN, the reliability of the RSs may deteriorate. In this case, the UE may make a request for the transmission of the RSs of the RN.

If the strength of an RS request signal which is transmitted from a UE to the RN exceeds a predetermined threshold, at least a predetermined number of RS request signals is received or an uplink data reception success ratio is a predetermined level or less, the RN may request resources to the eNB and additionally transmit the RSs of the RN.

If the RN transmits the wideband RSs in such a manner, the RSs for downlink data demodulation of the RN should be transmitted in the format of the dedicated RSs. At this time, upper layer signaling may be used. If the dedicated RSs defined in the LTE are used when the RN transmits RSs for data demodulation using the dedicated RSs, legacy support is possible. Accordingly, a plurality of dedicated RSs should be defined in the standard in consideration of the multiple transmission antennas of the RN.

The present invention relates to communication technology using an RN used for supplementing or improving a region in which the service of an eNB is insufficient or impossible in a mobile communication system, and is applicable to a system such as a 3GPP LTE system or a 3GPP LTE-A system.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

The invention claimed is:
1. A method for transmitting signals for a relay node, the method comprising:
    transmitting a first reference signal defined for at least one antenna port of a base station to a user equipment (UE) via a first transmission region in a subframe; and
    transmitting a control signal to the UE in the subframe, wherein the control signal indicates that a second reference signal defined for a remaining antenna port of the base station other than the at least one antenna port is transmitted by a relay node via a second transmission region, wherein the second reference signal is transmitted by the relay node to the UE via the second transmission region in the same subframe with the first reference signal, wherein the first reference signal and the second reference signal are different from each other, and wherein the first transmission region and the second transmission region do not overlap with each other.

2. The method of claim 1, wherein the first transmission region and the second transmission region are frequency division multiplexed or time division multiplexed.

3. The method of claim 1, wherein the second reference signal includes a reference signal for demodulation of data transmitted by the relay node.

4. A method for receiving signals by a user equipment (UE), the method comprising:

receiving a first reference signal defined for at least one antenna port of a base station from the base station via a first transmission region in a subframe;

receiving a control signal from the base station in the subframe, wherein the control signal indicates that a second reference signal defined for a remaining antenna port of the base station other than the at least one antenna port is transmitted by a relay node via a second transmission region; and receiving the second reference signal from the relay node via the second transmission region in the same subframe with the first reference signal, wherein the first reference signal and the second reference signal are different from each other, and wherein the first transmission region and the second transmission region do not overlap with each other.

5. The method of claim 4, wherein the first transmission region and the second transmission region are frequency division multiplexed or time division multiplexed.

6. The method of claim 4, wherein the second reference signal includes a reference signal for demodulation of data transmitted by the relay node.

* * * * *